United States Patent
Chew et al.

(10) Patent No.: US 8,009,687 B2
(45) Date of Patent: Aug. 30, 2011

(54) MEASUREMENT OF NETWORK PERFORMANCE IN TRANSPORTING PACKET STREAMS

(75) Inventors: Earl Chew, Vancouver (CA); Laura Choy, Burnaby (CA); Kevin M. Cattell, North Vancouver (CA)

(73) Assignee: Ixia, Calabasas, CA (US)

( * ) Notice: Subject to any disclaimer, the term of this patent is extended or adjusted under 35 U.S.C. 154(b) by 765 days.

(21) Appl. No.: 11/692,645

(22) Filed: Mar. 28, 2007

(65) Prior Publication Data

US 2008/0239974 A1    Oct. 2, 2008

(51) Int. Cl.
*G06F 11/24* (2006.01)
(52) U.S. Cl. .................... 370/412; 370/252; 370/432
(58) Field of Classification Search .............. 370/412, 370/432, 252
See application file for complete search history.

(56) References Cited

U.S. PATENT DOCUMENTS

| | | | | |
|---|---|---|---|---|
| 6,397,251 | B1* | 5/2002 | Graf | 709/225 |
| 2002/0016851 | A1* | 2/2002 | Border | 709/234 |
| 2003/0126294 | A1* | 7/2003 | Thorsteinson et al. | 709/247 |
| 2003/0128692 | A1* | 7/2003 | Mitsumori et al. | 370/352 |
| 2003/0219007 | A1* | 11/2003 | Barrack et al. | 370/352 |
| 2006/0146780 | A1* | 7/2006 | Paves | 370/348 |
| 2008/0144519 | A1* | 6/2008 | Cooppan | 370/252 |
| 2009/0252050 | A1* | 10/2009 | Jiang | 370/252 |

OTHER PUBLICATIONS

Welch, Apr. 2006 "A Proposed Media Delivery Index" (RFC 4445).*
RFC 4445—A proposed media Delivery Index (MDI) by Welch, Apr. 2006.*
"Media Delivery Index", IneoQuest Technologies, Inc, Mansfield, MA 02048, http://ftp.ineoquest.com/pub/docs/Datasheets/Media_Delivery_Index.pdf.
"IPTV QoE: Understanding Interpreting MDI Values," Agilent Technologies White Paper, pp. 1-6 (Copyright 2008).
"Information Technology—Generic Coding of Moving Pictures and Associated Audio Information: Systems," International Standard ISO/IEC 13818-1, pp. 1-14 (Oct. 15, 2007).

* cited by examiner

*Primary Examiner* — Dang T Ton
*Assistant Examiner* — Pamit Kaur
(74) *Attorney, Agent, or Firm* — Jenkins, Wilson, Taylor & Hunt, P.A.

(57) ABSTRACT

A method and apparatus for measuring network performance. A packet from a stream of multimedia data packets is received from across a network during a measurement interval. The time interval from the start of the measurement interval to receiving the packet is measured. The response of a buffer to the received packet is determined. The level of the buffer just before the packet arrives is calculated, based on the time interval. The level of the buffer just after the packet arrives is calculated, based on the previous level. A performance measure for the network is determined based on at least one of the two levels.

19 Claims, 5 Drawing Sheets

MEASUREMENT OF NETWORK PERFORMANCE IN TRANSPORTING PACKET STREAMS

BACKGROUND

Digital multimedia content (e.g. video and/or audio data) must be transported across communication networks in a reliable and timely manner to the end user. Streaming video services (e.g. Internet Protocol television (PIT), video conferencing, video-on-demand, etc.) are especially sensitive to delay, jitter, or data loss, which can all negatively impact the quality of the end user's experience. Typically, digital multimedia content is encoded prior to transmission across the network. Part 1 (Systems) of the Moving Pictures Expert Group (MPEG-2) standard defines a Transport Stream (TS) for encoding and transporting multimedia content across somewhat unreliable media such as broadcast channels, Internet Protocol networks, etc. The Transport Stream consists of packets that carry video or audio data in their payload. The TS packets are received and decoded to reconstruct the original multimedia content. The Transport Stream protocol is also specified in International Standard ISO/ICE13818-1.

Determining the performance of a network that carries digital multimedia content is an important element to the successful design and operation of such a network. One measure of a network's performance is known as the Media Delivery Index (MDI). The MDI has two components: the delay factor (DF) and the media loss rate (MIR). The MDI is expressed as two numbers separated by a colon: DF:MLR.

The DF component of the MDI is the maximum difference, observed at the end of each network packet, between the arrival of media data and the drain of media data. DF is indicative of the packet jitter. A high value for DF indicates that a larger buffer depth is required to minimize the effects of packet jitter. To calculate DF, consider a virtual buffer VB used to buffer received packets of a stream. Each time a packet $P_i$, where i>0, arrives during a measurement interval, consider the response of the virtual buffer to the arrival of packet $P_i$ by computing two VB values, VB(i,pre) and VB(i,post) as follows:

$$VB(i, \text{pre}) = \sum_{j=1}^{i-1} S_j - MR \cdot T_i \quad (1)$$

$$VB(i, \text{post}) = VB(i, \text{pre}) + S_i \quad (2)$$

where $S_j$ is the media payload size of the $j^{th}$ packet in the measurement interval, $T_i$ is the arrival time relative to the last received packet in the previous measurement interval, or in the case of the first measurement interval, relative to the first packet. MR is the nominal media rate in bytes per second. VB(i,pre) is the virtual buffer size just before the arrival of $P_i$, and VB(i,post) is the virtual buffer size just after the arrival of $P_i$. These calculations are subject to the initial condition of VB(0,post)=VB(0,pre)=0 and VB(1,pre)=−MR·$T_1$ at the beginning of each measurement interval. The measurement intervals are non-overlapping. The length of the measurement interval is arbitrary and may vary from application to application, but is typically selected to be 1 second.

The DF is calculated once every measurement interval as follows by finding the difference between the maximum and minimum values of VB:

$$DF = \frac{\max_{i \geq 0}(VB(i, \text{post})) - \min_{i \geq 0}(VB(i, \text{pre}))}{MR} \quad (3)$$

Note that the maximum and minimum include the zeros introduced by the initial conditions at i=0.

The MLR is defined as the number of lost or out-of-order packets per second. Unlike the DF, the measured result is not normalized by dividing by the bitrate. As a result, the two parts of the MDI are reported using different units of measurement.

For more information regarding the MDI, DF, and MLR measurements, please refer to the following publications: "A Proposed Media Delivery Index (MDI)", by J. Welch and J. Clark, published in April 2006 by the Internet Engineering Task Force as IETF RFC 4445 and available at the following URL: http://www.rfc-editor.org/rfc/rfc4445.txt; and "IPTV QoE: Understanding and Interpreting MDI Values", a white paper published by Agilent Technologies on Aug. 30, 2006 and available at the following URL: http://cp.literature.agilent.com/litweb/pdf/5989-5088EN.pdf FIG. 1 shows a graphical illustration of the prior art DF measurement. The y-axis represents a virtual buffer (VB), and the x-axis represents time. The measurement intervals on the x-axis are delineated by hash marks and labeled measurement intervals 1 through 4 (MI1 through MI4). The level of the virtual buffer is represented by line 10. The level increases as packets arrive and decreases as packets are drained at the media rate (MR). As indicated by the legend 12, received packets are represented by a star.

The slope 14 of the line when decreasing is the rate at which packets are drained from the VB, which is essentially the media rate MR in equation (1). The DF for each measurement interval is represented by vertical arrows DF1-DF4 spanning between the highest peak and the lowest trough within each measurement interval. (Note that vertical arrows DF1-DF4 are merely representations of DF—they are not the actual DF, since they have not been normalized by MR). The highest peak within each measurement interval corresponds to max (VB(i,post)) in equation (3), and the lowest trough within each measurement interval corresponds to min(VB(i, pre)) in equation (3).

Calculating the DF can be problematic for several reasons. First, although the measurement intervals do not overlap, the DF calculation relies on the time interval $T_i$ (see equation 1) which is measured relative to the last received packet in the previous measurement interval. This leads to a discrepancy in calculating DF for the very first measurement interval, since no prior measurement interval exists. As a result, the DF calculation for the first measurement interval is treated differently from the DF calculations for the remaining measurement intervals. This discrepancy is problematic because two different DF measurements of the same time interval in a packet stream could return different results, depending on when the measurements began.

Additionally, the DF can not be calculated for measurement intervals in which no packets are received. This may occur, for example, when a network has a temporary failure. In these situations, the DF for that packet-less measurement interval is defined to be the DF for the previous measurement interval in which packets were received. For example, in FIG. 1, no DF can be calculated in measurement interval 3 (MI3), since no packets arrived during that interval. Instead, the DF from the previous measurement interval (MI2) would be reported as the DF for measurement interval 3. Notice in FIG. 1 that DF3 is simply DF2 repeated for measurement interval 3. This practice leads to inaccurate and misleading DF values for packet-less measurement intervals.

Furthermore, when data packets do finally start arriving again, the DF calculation reports the delay accumulated across all the packet-less intervals, which can result in seemingly impossible DF values that are longer than the measurement interval itself. For example, in FIG. 1, the DF reported for measurement interval 4 (MI4) accumulates the delay from the previous measurement interval (MI3). Since the DF is reported in units of time, this results in a DF that is longer than the measurement interval itself, e.g. a DF that is 2.5 seconds in a measurement interval that is only 1 second long. This strange result can be confusing to users.

Finally, the DF does not consider the drain from the virtual buffer after the last packet in the measurement interval is received. This can be seen in FIG. 1. In measurement interval 2 (MI2), the result of equation (3) is that DF is measured only between peak point 16 and trough point 18. However, it is evident that the virtual buffer level is drained far below trough point 18 by the end of measurement interval 2, since there has been an interruption in the arrival of packets. Therefore, the DF reported for measurement interval 2 is smaller than it should be, giving the user an inaccurate and incomplete picture of the delay in that measurement interval.

Therefore, there remains a need for an improved method and apparatus for measuring and expressing the performance of a network that carries packet streams of digital multimedia content.

DETAILED DESCRIPTION

Figure 1:
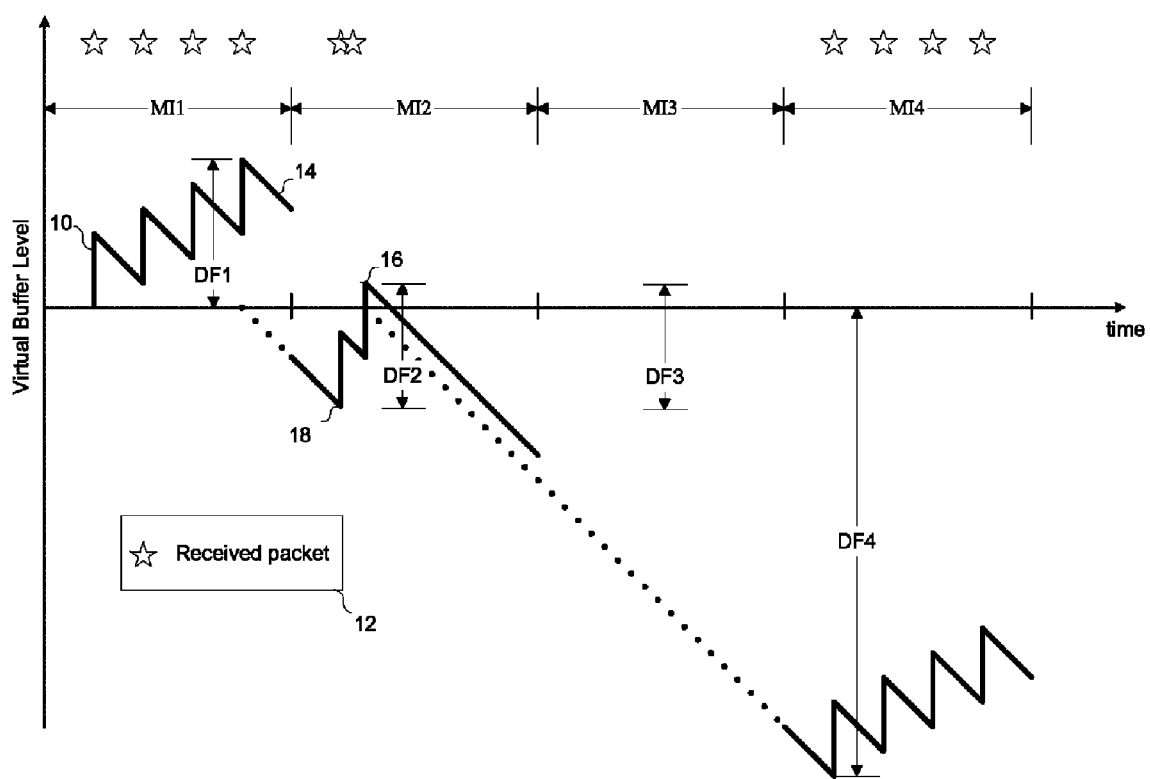
FIG. 1 shows a graphical illustration of the prior art Delay Factor (DF) measurement.
Figure 2:
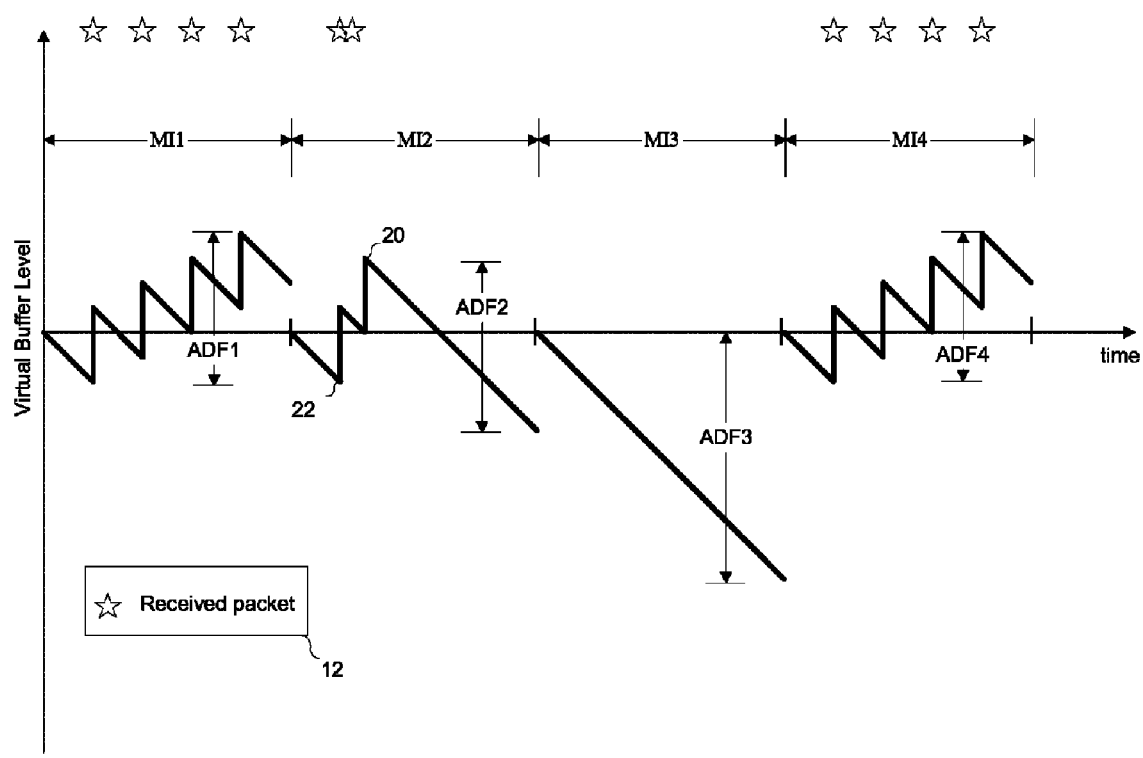
FIG. 2 shows a graphical illustration of an Alternative DF (ADF) measurement

FIG. 2 shows a graphical illustration of an Alternative DF (ADF) measurement, according to one embodiment of the present invention. The arrival pattern of packets is the same as in FIG. 1. However, the level of the virtual buffer is calculated differently for the ADF.

First, $T_i$ is redefined to be measured relative to the start of each measurement interval, rather than relative to the last received packet in the previous measurement interval. This new definition of the time interval shall be referred to as $T'_i$. The calculations to determine the response of the virtual buffer can be stated as follows:

$$VB'(i, \text{pre}) = \sum_{j=1}^{i-1} S_j - MR \cdot T'_i \quad (4)$$

$$VB'(i, \text{post}) = VB'(i, \text{pre}) + S_i \quad (5)$$

where $T'_i$ is the arrival time of the packet relative to the start of the measurement interval. These calculations are performed each time a packet i arrives during a measurement interval, where i=1, 2 . . . , k. These calculations are also subject to the initial condition of VB'(0,post)=VB'(0,pre)=0 at the beginning of each measurement interval. The other parameters $S_j$ and MR are given the same meaning as before.

Next, one additional virtual buffer value is calculated at the end of the measurement interval, to capture the drain from the virtual buffer that occurs after the last packet in the measurement interval is received. Define VB'(k+1,pre) to be the virtual buffer size at the end of the interval in which k packets have arrived as follows:

$$VB'(k+1, \text{pre}) = \sum_{j=1}^{k} S_j - MR \cdot T'_{k+1} \quad (6)$$

where $T'_{k+1}$ is the length of the measurement interval. The length of the measurement interval is arbitrary and may vary from application to application, but is typically selected to be 1 second, and is typically independent of packet arrivals.

The ADF is calculated once every measurement interval as follows by finding the difference between the maximum and minimum values of VB':

$$ADF = \frac{\max_{i=0\ldots k}(VB'(i, \text{post})) - \min_{i=0\ldots k+1}(VB'(i, \text{pre}))}{MR} \quad (7)$$

Notice that the max function only considers packet indices from 0 to k, whereas the min function considers packet indices from 0 to k+1 due to the consideration of the end of the measurement interval.

As shown graphically in FIG. 2, the ADF for each measurement interval is represented by vertical arrows ADF1-ADF4 spanning between the highest peak and the lowest point within each measurement interval. (Note that vertical arrows ADF1-ADF4 are merely representations of ADF—they are not the actual ADF, since they have not been normalized by MR). The highest peak within each measurement interval corresponds to $\max_{i=0\ldots k}(VB'(i,\text{post}))$ in equation (7), and the lowest point within each measurement interval corresponds to $\min_{i=0\ldots k+1}(VB'(i,\text{pre}))$ in equation (7).

Since the ADF does not rely on a packet arrival time from a previous measurement interval to calculate its virtual buffer levels, the first measurement interval does not need to be treated differently from the other measurement intervals. $T'_i$ is measured in the same manner for every measurement interval, whether it is the first measurement interval or the last.

Furthermore, the ADF can be calculated for every interval, even if no packets arrive in that interval. Notice in FIG. 2 that an ADF can be calculated for measurement interval 3 (MI3), even though no packets arrived.

Additionally, the ADF considers the level of a virtual buffer at the end of the measurement interval, including any further drainage after the arrival of the last packet in the measurement interval. This results in a more accurate representation of the delay. For example, in measurement interval 2 (MI2), the prior art DF would have been calculated between peak point 20 and trough point 22. Instead, the ADF considers the additional drainage from the virtual buffer and results in ADF2, which spans between peak point 20 and the last data point in measurement interval 2 (MI2).

Finally, the ADF is independent across measurement intervals—the maximum value for an ADF is the length of the measurement interval itself. This limit is a more logical conclusion to a user. This difference between the ADF and the DF can be seen in measurement interval 3 (MI3). The maximum ADF that can be reported is shown by ADF3 in FIG. 2.

Although the above examples are based on the premise that equations (4) through (6) are implemented by considering the effect of the arriving packets and media rate drain on a virtual buffer, it should be noted that an actual, physical buffer may also be used to calculate equations (4) through (6).

Figure 3:
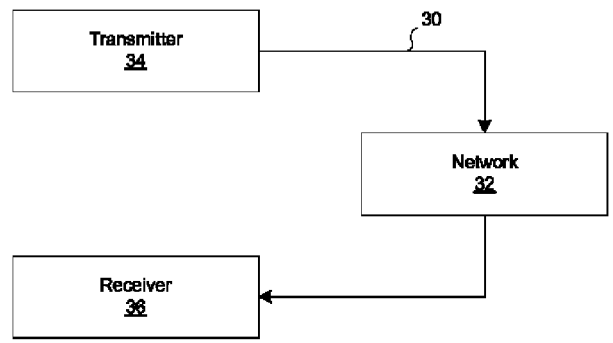
FIG. 3 shows a block diagram of a system for sending a transport packet stream across a network.

FIG. 3 shows a block diagram of a system for sending a transport packet stream 30 across a network 32. The transport packet stream consists of Transport Stream (TS) packets, encoded according to the ISO/IEC 13818-1 MPEG-2 standard. A transmitter 34 sends the TS packets across the network 32 to a receiver 36. The performance of the network 32 can be measured using the ADF.

Figure 4:
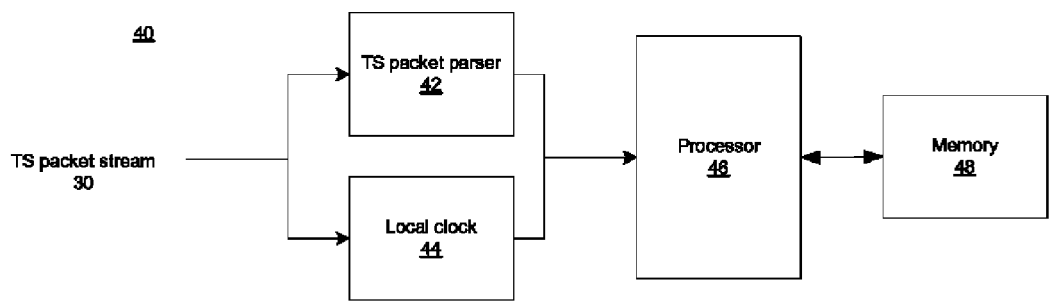
FIG. 4 is a block diagram of a system for calculating an ADF.

FIG. 4 is a block diagram of a system 40 for calculating an ADF for a network carrying TS packets, according to one embodiment. The system 40 includes a TS packet parser 42, a local clock 44, a processor 46, and a memory 48. The system 40 can be located in a measurement instrument that receives the transport packet stream 30. For example, the measurement instrument could be connected to the network 30 as receiver 36 in FIG. 3.

The TS packet parser 42 parses an incoming transport packet stream 30 and determines the size $S_i$ of each packet. The local clock 44 is used to time each measurement interval and determine the time $T_i'$ at which each TS packet arrives, relative to the start of a measurement interval. The processor 46 receives the size $S_i$ and the time $T_i'$, calculates the values VB'(i,pre) and VB'(i,post) according to equations (4) and (5) for each packet, and stores the maximum VB'(i,post) and minimum VB'(i,pre) in the memory 48. At the end of the measurement interval, the processor 46 also calculates one final value VB'(k+1,pre) according to equation (6) and updates the minimum VB'(i,pre) in the memory 48 if needed. Finally, the processor 46 calculates the ADF according to equation (7).

Figure 5:
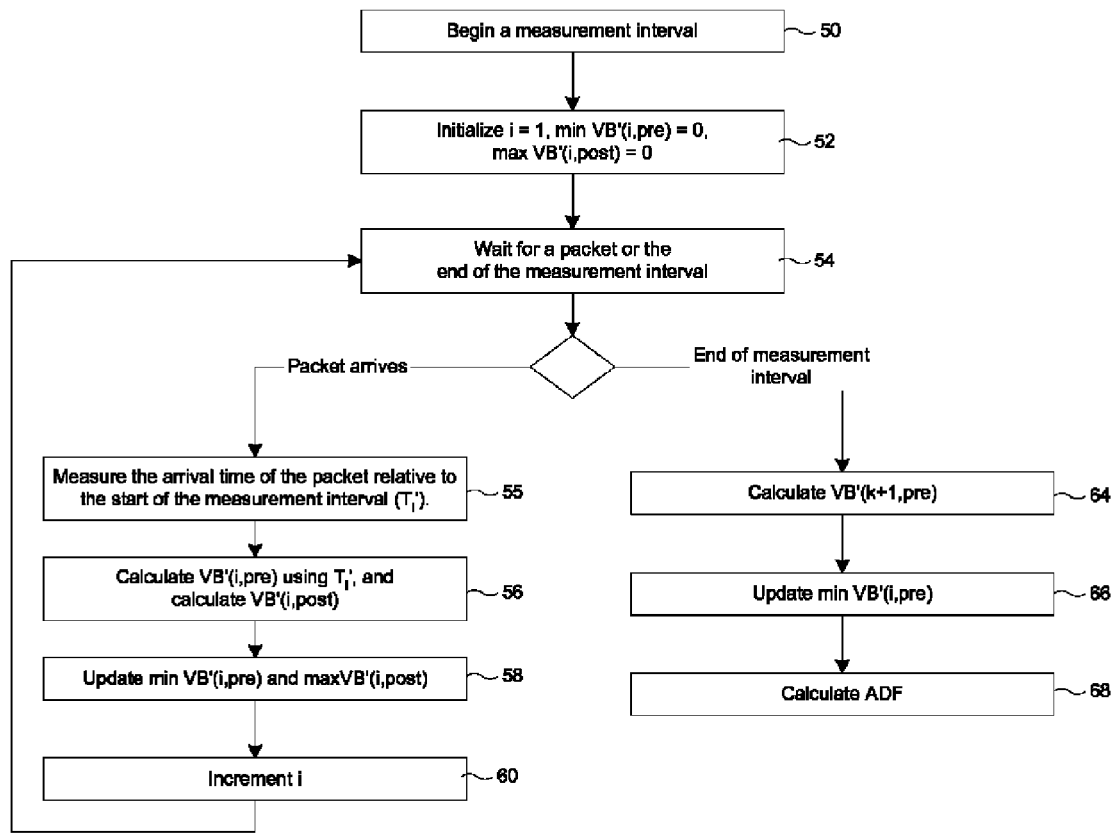
FIG. 5 is a flow chart illustrating a method for calculating an ADF.

FIG. 5 is a flow chart illustrating a method for calculating an ADF, according to one embodiment. In step 50, a measurement interval is begun. In step 52, various values are initialized. The index i for the packets is set to 1, and the minimum value of VB'(i,pre) and maximum value of VB'(i,post) are set to 0.

Next in step 54, wait for the arrival of a packet or the end of the measurement interval. If a packet arrives, proceed to step 55 and measure the value $T_i'$, which is the arrival time of the packet relative to the start of the measurement interval. Use the value $T_i'$ to calculate the values of VB'(i,pre) and VB'(i,post) in step 56. Once the values for VB'(i,pre) and VB'(i,post) are determined for that iteration, compare them to the stored values for min VB'(i,pre) and max VB'(i,post), and update min VB'(i,pre) and max VB'(i,post) if necessary (step 58). Then in step 60, increment the index i and return to step 54 to await the arrival of the next packet and another iteration of steps 56-60.

If the end of the measurement interval has been reached, proceed to step 64 and calculate the final value VB'(k+1,pre) according to equation (6) to account for any additional drain. Next in step 66, update the min VB'(i,pre) if needed, e.g. if VB'(k+1,pre) is the minimum VB'(i,pre) value in the measurement interval. Finally, in step 68, calculate ADF according to equation (7).

As previously mentioned, the two parts in the media delivery index—the DF and the MLR—are currently reported using different units of measurement. The DF is reported using units of time, whereas the MLR is reported using units of packet size per unit time (e.g. bytes per second). To ensure that the media loss can be reported using the same units of measurement as the DF, an alternative media loss (AML) measurement is proposed. The AML is obtained by dividing the quantity of lost (or out-of-order) packets in a given measurement interval by the media rate (MR). In this manner, the AML can be reported in units of time as well, in a manner consistent with the DF and the ADF, which is a desirable property for a media measurement.

Figure 6:
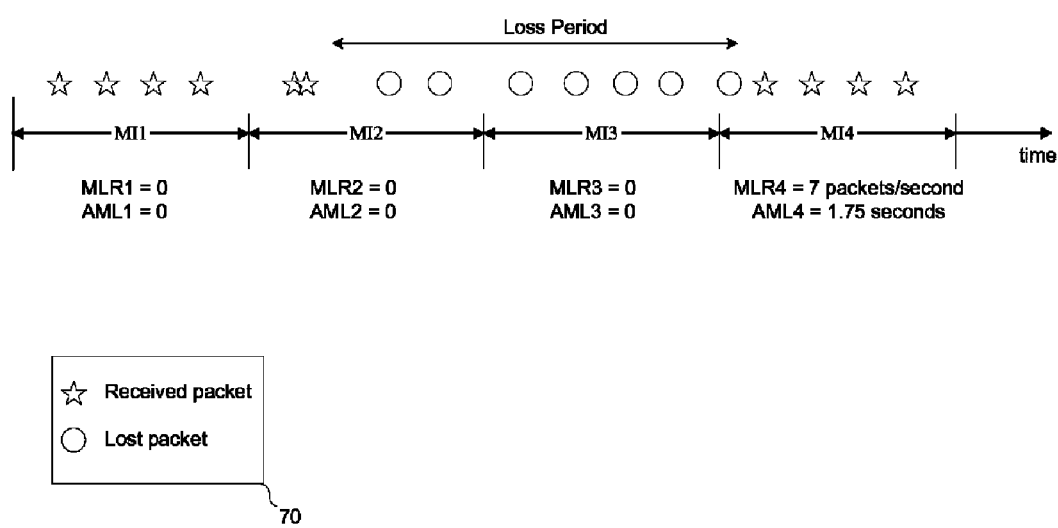
FIG. 6 plots the arrival of transport stream (TS) packets against an x-axis that represents time.

FIG. 6 plots the arrival of TS packets against an x-axis that represents time, for the purpose of illustrating the MLR and AML measurements. The measurement intervals on the x-axis are delineated by hash marks and labeled measurement intervals 1 through 4 (MI1 through MI4). As indicated by the legend 70, received packets are represented by a star, and lost packets are represented by a circle.

The MLR and AML measurements are reported below each measurement interval. The MLR and AML measurements are the same for measurement intervals 1 through 3 (MI1-MI3). However, in measurement interval 4 (MI4), the difference between the MLR and the AML can be seen. MLR4 is reported as 7 packets per second. AML is reported as 7 packets divided by MR. If the MR is 4 packets per second (as it is in the example of FIG. 6), AML is equal to (7 packets)/(4 packets/seconds)=1.75 seconds. This normalizes AML and gives it the same units of measurement as the DF or ADF.

Although the present invention has been described in detail with reference to particular embodiments, persons possessing ordinary skill in the art to which this invention pertains will appreciate that various modifications and enhancements may be made without departing from the spirit and scope of the claims that follow.

What is claimed is:

1. A method of determining a performance measure for a network for a measurement interval, the method; comprising:
   receiving a packet from a stream of multimedia data packets from across a network;
   measuring an arrival time from the start of the measurement interval to the time at which the packet is received;
   determining a response of a buffer to the packet, said response comprising calculating a plurality of buffer levels including:
      a first buffer level corresponding to a time just after the packet arrives or corresponding to the start of the measurement interval; and
      a second buffer level corresponding to the end of the measurement interval, wherein the measurement interval is independent of packet arrival; and
   determining the performance measure for the network depending on at leas the second buffer level.

2. The method as in claim 1, wherein the buffer is a virtual buffer.

3. The method as in claim 1, wherein the buffer is a physical buffer.

4. The method as in claim 1, wherein the multimedia data packets are encoded according to the International Standard ISO/IEC 13818-1.

5. The method as in claim 1, wherein the performance measure is a measure of packet jitter in the network.

6. The method as in claim 1, wherein the multimedia data packets carry data for a streaming video service.

7. The method as in claim 6, wherein the streaming video service is selected from the group consisting of Internet Protocol television (IPTV), video conferencing, and video-on-demand.

8. The method as in claim 1, further comprising:
determining a loss count of packets that are lost across the network from the stream of multimedia data packets; and
calculating a metric of packet loss by dividing the loss count by a specified rate.

9. The method as in claim 1, wherein determining the performance measure is also based on an arrival time, wherein the arrival time is measured relative to the start of the measurement interval.

10. The method as in claim 9, wherein
the measurement interval is one of a sequence of measurement intervals, and
the arrival time is determined in the same manner for the first measurement interval in the sequence as it is for subsequent measurement intervals in the sequence.

11. The method as in claim 1, further comprising:
determining the performance measure during an empty measurement interval in which no packets are received.

12. The method as in claim 1, wherein the maximum value of the performance measure is equal to-the length of the measurement interval.

13. The method as in claim 1, further comprising:
determining a loss count of packets that are lost across the network; and
calculating a metric of packet loss by dividing the loss count by a specified rate.

14. A system that measures performance of a network that transports a packet stream, comprising:
a packet parser that parses a packet from the packet stream;
a local clock that determines a packet arrival time measured from the start of a measurement interval; and
a processor that determines a response of a virtual buffer to the packet based on the packet arrival time, and further determines a performance measure for the network based on the response of the virtual buffer, said response comprising calculating a plurality of buffer levels including:
a first buffer level corresponding to a time just after the packet arrives or corresponding to the start of the measurement interval; and
a second buffer level corresponding to the end of the measurement interval;
wherein the processor determines the performance measure for the measurement interval based on at least the second buffer level and the measurement interval is independent of packet arrival.

15. The system as in claim 14, wherein the packet stream is encoded according to the International Standard ISO/IEC 13818-1.

16. The system as in claim 14, wherein the performance measure is a measure of packet jitter in the network.

17. The system as in claim 14, wherein the packet stream carries data for a streaming video service.

18. The system as in claim 17, wherein the streaming video service is selected from the group consisting of Internet Protocol television (IPTV), video conferencing, and video-on-demand.

19. The system as in claim 14, wherein
the processor determines a loss count of packets that are lost across the network from the packet stream, and
the processor calculates a packet loss rate by dividing the loss count by a specified rate.

* * * * *